US009003007B2

(12) United States Patent
Kern

(10) Patent No.: US 9,003,007 B2
(45) Date of Patent: *Apr. 7, 2015

(54) ADMINISTRATION OF VIRTUAL MACHINE AFFINITY IN A DATA CENTER

(75) Inventor: Eric R. Kern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/461,883

(22) Filed: May 2, 2012

(65) Prior Publication Data

US 2012/0216196 A1 Aug. 23, 2012

Related U.S. Application Data

(63) Continuation of application No. 12/730,402, filed on Mar. 24, 2010, now Pat. No. 8,255,508.

(51) Int. Cl.
*G06F 15/173* (2006.01)
*G06F 9/50* (2006.01)
*G06F 9/46* (2006.01)
*G06F 11/00* (2006.01)

(52) U.S. Cl.
CPC .................................. *G06F 9/5077* (2013.01)

(58) Field of Classification Search
None
See application file for complete search history.

(56) References Cited

U.S. PATENT DOCUMENTS

| | | | |
|---|---|---|---|
| 5,101,346 A | 3/1992 | Ohtsuki | |
| 7,093,086 B1 | 8/2006 | Rietschote et al. | |
| 7,370,164 B1 | 5/2008 | Nagarkar et al. | |
| 7,502,962 B2 | 3/2009 | Yach et al. | |
| 7,802,248 B2 | 9/2010 | Broquere et al. | |
| 7,831,600 B2 | 11/2010 | Kilian | |
| 7,890,613 B2 | 2/2011 | Tameshige et al. | |
| 7,917,617 B1 | 3/2011 | Ponnapur et al. | |

(Continued)

FOREIGN PATENT DOCUMENTS

EP 2043320 B1 4/2009

OTHER PUBLICATIONS

Final Office Action, U.S. Appl. No. 12/752,762, Oct. 29, 2012.
Office Action, U.S. Appl. No. 12/760,141, Dec. 10, 2012.
Office Action, U.S. Appl. No. 12/730,402, Dec. 1, 2011.
Notice of Allowance, U.S. Appl. No. 12/730,402, Apr. 16, 2012.

(Continued)

*Primary Examiner* — Wen-Tai Lin

(74) *Attorney, Agent, or Firm* — Edward J. Lenart; Mark McBurney; Biggers Kennedy Lenart Spraggins LLP

(57) ABSTRACT

Administration of virtual machine affinity in a data center, where the data center includes a plurality of virtual machines ('VMs'), each VM being a module of automated computing machinery installed upon a computer in the data center and characterized by a Universally Unique Identifier ('UUID'), at least two of the VMs having an affinity requirement to be installed on separate computers, the data center further including a data center administration server operably coupled to the VMs, including communicating, by at least one of the VMs having an affinity requirement to the data center administration server, the UUIDs of the VMs having an affinity requirement; and moving by the data center administration server the VMs having an affinity requirement to separate computers in the data center.

20 Claims, 5 Drawing Sheets

(56) References Cited

U.S. PATENT DOCUMENTS

| | | |
|---|---|---|
| 8,046,473 B2 | 10/2011 | Piper et al. |
| 8,060,476 B1 | 11/2011 | Afonso et al. |
| 2004/0221290 A1 | 11/2004 | Casey et al. |
| 2005/0081201 A1 | 4/2005 | Aguilar et al. |
| 2005/0198303 A1 | 9/2005 | Knauerhase et al. |
| 2005/0262504 A1 | 11/2005 | Esfahany et al. |
| 2006/0085792 A1 | 4/2006 | Traut |
| 2006/0184936 A1 | 8/2006 | Abels et al. |
| 2007/0079308 A1* | 4/2007 | Chiaramonte et al. ............ 718/1 |
| 2007/0310566 | 6/2007 | Van Rietschote et al. |
| 2007/0208918 A1 | 9/2007 | Harbin et al. |
| 2007/0244938 A1 | 10/2007 | Michael et al. |
| 2008/0263544 A1 | 10/2008 | Amano et al. |
| 2008/0295094 A1 | 11/2008 | Korupolu et al. |
| 2009/0037585 A1 | 2/2009 | Miloushev et al. |
| 2009/0070771 A1 | 3/2009 | Yuyitung et al. |
| 2009/0113109 A1 | 4/2009 | Nelson et al. |
| 2009/0138541 A1 | 5/2009 | Wing et al. |
| 2009/0204826 A1 | 8/2009 | Cox et al. |
| 2009/0249284 A1 | 10/2009 | Antosz et al. |
| 2009/0249334 A1 | 10/2009 | Yamaguchi et al. |
| 2009/0271472 A1 | 10/2009 | Scheifler et al. |
| 2009/0288084 A1 | 11/2009 | Astete et al. |
| 2009/0293056 A1 | 11/2009 | Ferris |
| 2009/0300076 A1 | 12/2009 | Friedman et al. |
| 2009/0300151 A1 | 12/2009 | Friedman et al. |
| 2009/0300210 A1 | 12/2009 | Ferris |
| 2010/0037038 A1 | 2/2010 | Bieswanger et al. |
| 2010/0042720 A1 | 2/2010 | Stienhans et al. |
| 2010/0106885 A1 | 4/2010 | Gao et al. |
| 2010/0107158 A1 | 4/2010 | Chen et al. |
| 2010/0115332 A1 | 5/2010 | Zheng et al. |
| 2010/0131324 A1 | 5/2010 | Ferris |
| 2010/0205304 A1 | 8/2010 | Chaturvedi et al. |
| 2010/0211829 A1 | 8/2010 | Ziskind et al. |
| 2010/0241896 A1 | 9/2010 | Brown et al. |
| 2010/0293409 A1 | 11/2010 | Machida |
| 2010/0306379 A1 | 12/2010 | Ferris |
| 2010/0306382 A1 | 12/2010 | Cardosa et al. |
| 2011/0010515 A1 | 1/2011 | Ranade |
| 2011/0022695 A1 | 1/2011 | Dalal et al. |
| 2011/0022812 A1 | 1/2011 | Van der Linden et al. |
| 2011/0060744 A1 | 3/2011 | Brignull et al. |
| 2011/0060832 A1 | 3/2011 | Govil et al. |
| 2011/0072208 A1 | 3/2011 | Gulati et al. |
| 2011/0126275 A1 | 5/2011 | Anderson et al. |
| 2011/0179176 A1 | 7/2011 | Ravichandran et al. |
| 2011/0208908 A1 | 8/2011 | Chou et al. |
| 2011/0231696 A1 | 9/2011 | Ji et al. |
| 2011/0231698 A1 | 9/2011 | Zlati et al. |
| 2011/0238803 A1 | 9/2011 | Kern |
| 2011/0246627 A1 | 10/2011 | Kern |
| 2011/0246992 A1 | 10/2011 | Kern |
| 2011/0252420 A1 | 10/2011 | Tung et al. |
| 2011/0258481 A1 | 10/2011 | Kern |
| 2011/0258621 A1 | 10/2011 | Kern |
| 2013/0311824 A1* | 11/2013 | Ji et al. ............................ 714/15 |

OTHER PUBLICATIONS

Office Action, U.S. Appl. No. 12/752,762, May 31, 2012.
Office Action, U.S. Appl. No. 12/752,322, May 16, 2012.
Lagar-Cavilla et al., "SnowFlock: rapid virtual machine cloning for cloud computing", 2009, in Proceedings of the 4$^{th}$ ACM European conference on Computer systems (EUroSys '09). ACM, New York, NY, USA, 1-12.
Office Action, U.S. Appl. No. 12/759,976, Aug. 28, 2012.
Office Action, U.S. Appl. No. 12/760,141, Jul. 10, 2012.
Final Office Action, U.S. Appl. No. 12/785,322, Aug. 29, 2012.
Office Action, U.S. Appl. No. 12/759,976, Mar. 20, 2013.
Chieu et al., "Dynamic Scaling of Web Applications in a Virtualized Cloud Computing Environment", IEEE International Conference on e-Business Engineering, (ICEBE '09) Oct. 2009, pp. 281-286, IEEE Xplore Digital Library (online), USA, DOI: 10.1109/ICEBE.2009.45.
Amazon, "Amazon Auto Scaling", Developer Guide, API Version, May 2009, 115 pages, Amazon Web Services (online), URL: http://awsdocs.s3.amazonaws.com/AutoScaling/latest/as-dg.pdf.
Amazon, "Auto Scaling", amazon.com (online), accessed Feb 7, 2010, pp. 1-6, URL: http://aws.amazon.com/autoscaling/.
Costanzo et al., "Harnessing Cloud Technologies for a Virtualized Distributed Computing Infrastructure", IEEE Internet Computing, vol. 13, Issue 5, Sep. 2009, pp. 24-33, IEEE Xplore Digital Library (online), USA, DOI: 10.1109/MIC.2009.108.
IBM, "Method and System for Workload Routing in a Cloud", Technical Disclosure, IP.com prior art database (online), Nov. 2009, pp. 1-5. IP.com No. IPCOM000190107D, USA.
Jamal et al., "Virtual Machine Scalability on Multi-Core Processors Based Servers for Cloud Computing Workloads", IEEE International Conference on Networking, Architecture, and Storage (NAS 2009), Jul. 2009, pp. 90-97, IEEE Xplore Digital Library (online), USA, DOI: 10.1109/NAS.2009.20.
Kupferman et al., "Scaling Into The Cloud", Department of Computer Science, May 2011, pp. 1-8, University of California, Santa Barbara, (online), URL: http://cs.ucsb.edu/~jkupferman/docs/ScalingIntoTheClouds.pdf.
Lagar-Cavilla et al., "SnowFlock: Rapid Virtual Machine Cloning for Cloud Computing", Proceedings of the 4th ACM European Conference on Computer Systems (EuroSys'09), Sep. 2009, pp. 1-12, ACM New York, NY, USA.
IBM, "System and apparatus for automatic health monitoring and maintenance of virtual machines", Technical Disclosure, IP.com prior art database (online), Dec. 2009, pp. 1-3, IP.com No. IPCOM000191156D, USA.
Kangarlou et al., "VNsnap: Taking Snapshots of Virtual Networked Environments With Minimal Downtime", IEEE/IFIP International Conference on Dependable Systems & Networks (DSN '09), Jun. 2009, pp. 524-532, IEEE Xplore Digital Library (online), USA, DOI: 10.1109/DSN.2009.5270298.

* cited by examiner

ADMINISTRATION OF VIRTUAL MACHINE AFFINITY IN A DATA CENTER

CROSS-REFERENCE TO RELATED APPLICATION

This application is a continuation application of and claims priority from U.S. patent application Ser. No. 12/730,402, filed on Mar. 24, 2010.

BACKGROUND OF THE INVENTION

1. Field of the Invention

The field of the invention is data processing, or, more specifically, methods, apparatus, and products for administration of virtual machine affinity in a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One kind of computer system that has experienced recent advances in the data center.

Modern data centers with hundred or thousands of blade servers enable system administrators to build highly customized virtual machines to meet a huge variety of end user requirements. Many virtual machines, however, can reside on a single powerful blade server. This can represent a problem when a multi-tiered application, for example, has a requirement that two or more of its virtual machines reside on different physical hardware in order to satisfy high availability requirements.

SUMMARY OF THE INVENTION

Methods, apparatus, and computer program products for administration of virtual machine affinity in a data center, where the data center includes a plurality of virtual machines ('VMs'), each VM being a module of automated computing machinery installed upon a computer in the data center and characterized by a Universally Unique Identifier ('UUID'), at least two of the VMs having an affinity requirement to be installed on separate computers, the data center further including a data center administration server operably coupled to the VMs, including communicating, by at least one of the VMs having an affinity requirement to the data center administration server, the UUIDs of the VMs having an affinity requirement; and moving by the data center administration server the VMs having an affinity requirement to separate computers in the data center.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
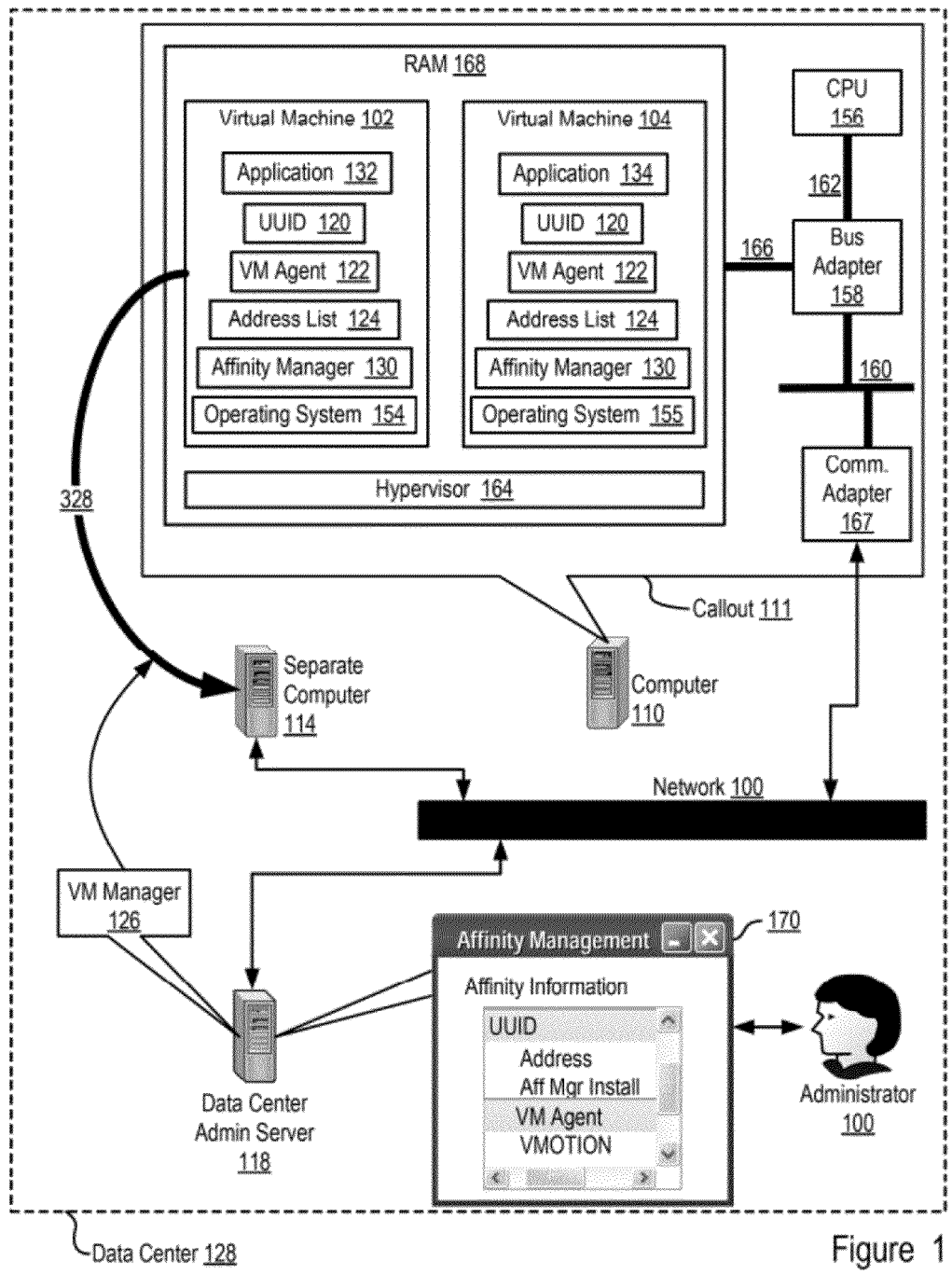
FIG. 1 sets forth a network diagram of apparatus in a data center that administers virtual machine affinity according to embodiments of the present invention.

Exemplary methods, apparatus, and products for administration of virtual machine affinity in a data center in accordance with the present invention are described with reference to the accompanying drawings, beginning with FIG. 1. FIG. 1 sets forth a network diagram of apparatus in a data center (128) that administers virtual machine affinity according to embodiments of the present invention. A data center (118) is a facility used for housing a large amount of electronic equipment, typically computers and communications equipment. A data center is maintained by an organization for the purpose of handling the data necessary for its operations. A bank, for example, may have a data center, where all its customers' account information is maintained and transactions involving these accounts are carried out. Practically every company that is mid-sized or larger has some kind of data center with the larger companies often having dozens of data centers. A data center will typically include many computers, although for ease of explanation, the data center (118) in the example of FIG. 1 is shown with only three (110, 114, and 118). The apparatus in the example of FIG. 1 includes a data center administration server (118), a data center computer (110), another data center computer (114) that is referred to as a 'separate' computer, and a data communications network (100) that couples the computers (118, 110, 114) in the data center (128) for purposes of data communications among them.

A computer (110, 114, 118), as the term is used in this specification, refers generally to a multi-user computer that provides a service (e.g. database access, file transfer, remote access) or resources (e.g. file space) over a network connection. The term 'computer,' as context requires, refers inclusively to the computer's hardware as well as any application software, operating system software, or virtual machine running on the computer. A computer application in this context, a data center, is often an application program that accepts connections through a computer network in order to service requests from users by sending back responses. The form factor of data center computers is often a blade; such computers are often referred to as blade servers. Examples of applications include file servers, database servers, backup servers, print servers, mail servers, web servers, FTP servers, application servers, VPN servers, DHCP servers, DNS servers, WINS servers, logon servers, security servers, domain controllers, backup domain controllers, proxy servers, firewalls, and so on.

Administration of virtual machine affinity in a data center in accordance with the present invention is implemented generally with computers, that is, with automated computing machinery. In the system of FIG. 1, the data center administration server (118), the data center computer (110), the separate computer (114), and the network (100) are all implemented as or with automated computing machinery. For further explanation, FIG. 1 sets forth in a callout (111) a block diagram of some of the components of automated computing machinery comprised within the data center computer (110)

that are used to administer virtual machine affinity in the data center according to embodiments of the present invention. The computer (110) of FIG. 1 includes at least one computer processor (156) or 'CPU' as well as random access memory (168) ('RAM') which is connected through a high speed memory bus (166) and bus adapter (158) to processor (156) and to other components of the computer (110). The exemplary computer (110) of FIG. 1 includes a communications adapter (167) for data communications with other computers (182) and for data communications through a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for administration of virtual machine affinity in a data center according to embodiments of the present invention include modems for wired dial-up communications, Ethernet (IEEE 802.3) adapters for wired data communications network communications, and 802.11 adapters for wireless data communications network communications.

Stored in RAM (168) in the example computer (110) of FIG. 1 is a hypervisor (164). The hypervisor is a mechanism of platform-virtualization, a module of automated computing machinery that allows multiple operating systems to run concurrently in separate virtual machines on a same host computer. The hypervisor (164) in this example is a native or bare-metal hypervisor that is installed directly upon the host computer's hardware to control the hardware and to monitor guest operating systems (154, 155) that execute in virtual machines (102, 104). Each guest operating system runs on a virtual machine that represents another system level above the hypervisor on computer (110). Examples of hypervisors useful or that can be improved for use in administration of virtual machine affinity in a data center according to embodiments of the present invention include IBM's z/VM™, VMware's vCenter™, INTEGRITY™ from Green Hills Software, LynxSecure™ from LynuxWorks, IBM's POWER Hypervisor (PowerVM)™, Oracle's VM Server™, and Sun's Logical Domains Hypervisor™.

In the example of FIG. 1, the hypervisor (164) implements two virtual machines (102, 104) in computer (110). Each virtual machine ('VM') (102, 104) runs an application program (132, 134) and an operating system (154, 155). Each VM (102, 104) is a module of automated computing machinery, configured by the hypervisor, to allow the applications (132, 134) to share the underlying physical machine resources of computer (110), the CPU (156), the RAM (168), and so on. Each VM runs its own, separate operating system (154, 155), and each operating system presents system resources to the applications (132, 134) as though each application were running on a completely separate computer. That is, each VM is 'virtual' in the sense of being actually a complete computer in almost every respect. The only sense in which a VM is not a complete computer is that a VM usually makes available to an application or an operating system only a portion of the underlying hardware resources of a computer, particularly memory, CPU, and I/O resources. Otherwise, and always from the point of view of an application, a VM is a computer.

Among other things, the VMs (102, 104) enable multiple operating systems, even different kinds of operating systems, to co-exist on the same underlying computer hardware, in strong isolation from one another. The association of a particular application program with a particular VM eases the tasks of application provisioning, maintenance, high availability, and disaster recovery in a data center. Because the operating systems (154, 155) are not required to be the same, it is possible to run Microsoft Windows™ in one VM and Linux™ in another VM on the same computer. Such an architecture can also run an older version of an operating system in one VM in order to support software that has not yet been ported to the latest version, while running the latest version of the same operating system in another VM on the same computer. Operating systems that are useful or that can be improved to be useful in administration of virtual machine affinity in a data center according to embodiments of the present invention include UNIX™, Linux™, Microsoft XP™, AIX™, and IBM's i5/OS™.

In the example of FIG. 1, each VM is characterized by a Universally Unique Identifier ('UUID') (120). The VMs in the example of FIG. 1 implement a distributing computing environment, and a UUID is an identifier of a standard administered by the Open Software Foundation that enable a distributed computing environment to uniquely identify components in the environment without significant central coordination. A UUID can uniquely identify a component such as a VM with confidence that the identifier, that is, the value of a particular UUID, will never be unintentionally used to identify anything else. Information describing components labeled with UUIDs can, for example, later be combined into a single database without needing to resolve name conflicts, because each UUID value uniquely identifies the component with which it is associated. Examples of UUID implementations that can be adapted for use in administration of VM affinity in a data center according to embodiments of the present invention include Microsoft's Globally Unique Identifiers™ and Linux's ext2/ext3 file system.

The data center administration server is operably coupled to the VMs through the data communications network (100), and, although the VMs (102, 104) in this example are initially installed on the same computer (110), the VMs in this example have an affinity requirement to be installed on separate computers. The affinity requirement is evidenced by the fact that both VMs are in possession of an affinity manager (130) and a list (124) of network addresses of VMs having an affinity requirement to be installed on separate computers. An affinity requirement for VMs is an effect of a characteristic of the application programs (132, 134) that run in the VMs, a characteristic based on a relationship or causal connection between the application programs. Examples of such characteristics effecting affinity requirements include these relationships among application programs:

the application programs are duplicate instances of the same program simultaneously executing same functions that need to be on separate computers to effect a Quality Of Service ('QOS') requirement or a Service Level Agreement ('SLA');

the application programs are redundant compute nodes for failover in a high-availability cluster;

the application programs are compute nodes in a load-balancing cluster;

the application programs are compute nodes in a highly parallel single-instruction-multiple-data ('SIMD') cluster; and each application program is a component of a different level of a multi-tiered application that needs to run on a separate computer to satisfy high availability requirements.

The VMs (102, 104) in this example were initially installed by the data center administration server (118) without affinity requirements, which is how they came to be installed on the same computer (110). After the initial installation, a system administrator (100) used an affinity management tool (170), a user interface exposed by the data center administration server (118), to identify the affinity between the VMs and install the affinity managers (130) and the address lists (124) in the VMs. At least one of the VMs then communicates to the data center administration server the UUIDs of the VMs having the affinity requirement, and the data center administration server moves VMs having an affinity requirement to separate computers in the data center.

In particular in this example, the data center administration server moves (328) VM (102) from computer (110) to a separate computer (114), thereby effectively moving the VMs having an affinity requirement to separate computers in the data center. In apparatus like that of FIG. 1, each VM can be fully characterized by contents of computer memory, including the contents of a CPUs architectural registers at any given point in time. Such a move of a VM to a separate computer then can be carried out by the data center administration server by terminating operation of a VM; moving all the contents of memory that characterize that VM at the point in time when its operations are terminated to another computer, including the contents of CPU registers that were in use at the point in time when operations are terminated; and then restarting operation of that VM on the new computer at the processing point where its operations were terminated. An example of a module that can be adapted to move a VM to a separate computer according to embodiments of the present invention is VMware's VMotion™.

It is said that 'at least one' of the VMs communicates the UUIDs to the data center administration server because there is more than one way that this communication can be carried out. Each of the VMs having an affinity requirement can, for example, communicate its UUID to a particular one of the VMs having an affinity requirement, and that particular one of the VMs can then communicate the UUIDs to the data center administration server. Or the VMs having an affinity requirement can communicate their UUIDs among all the VMs that have an affinity requirement, and all of the VMs having affinity requirements can then communicate the UUIDs to the data center administration server. In embodiments where all the VMs with an affinity requirement send the UUIDs to the data center administration server, the server (118) is required to disregard duplicate notifications, but the overall protocol is relatively simple: all the VMs just do the same thing.

In embodiments where only one VM sends the UUIDs to the server (118), the server function is simpler because the server only receives one set of UUIDs, but the communications protocol among the VMs could be more complex because it could include an additional protocol handshake for the VMs to agree upon the particular VM to send the UUIDs to the server (118). In some embodiments, therefore, the data center administration server is configured to install the list (124) of data communications network addresses of the VMs having affinity requirements in only one of the VMs having affinity requirements. Then the protocol for communication of the UUIDs among the VMs having the affinity requirement is a polling protocol in which the VM having the network addresses polls the other VMs having the affinity requirement for their UUIDs.

The applications (132, 134), the operating systems (154, 155), the VM agents (122), and the Affinity Managers (130) in the example of FIG. 1 are illustrated for ease of explanation as disposed in RAM (168), but many components of such software typically are stored in non-volatile memory also, such as, for example, on a disk drive or in Electrically Erasable Read Only Memory or 'Flash' memory. In addition, being modules of automated computing machinery, a module such as an application (132, 134), an operating system (154, 155), a VM agent (122), or an affinity manager (130) can be implemented entirely as computer hardware, a network of sequential and non-sequential logic, as well as in various combinations of computer hardware and software, including, for example, as a Complex Programmable Logic Device ('CPLD'), an Application Specific Integrated Circuit ('ASIC'), or a Field Programmable Gate Array ('FPGA').

The arrangement of the server (118), the computers (110, 114), and the network (100) making up the example apparatus illustrated in FIG. 1 are for explanation, not for limitation. Data processing systems useful for administration of virtual machine affinity in a data center according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
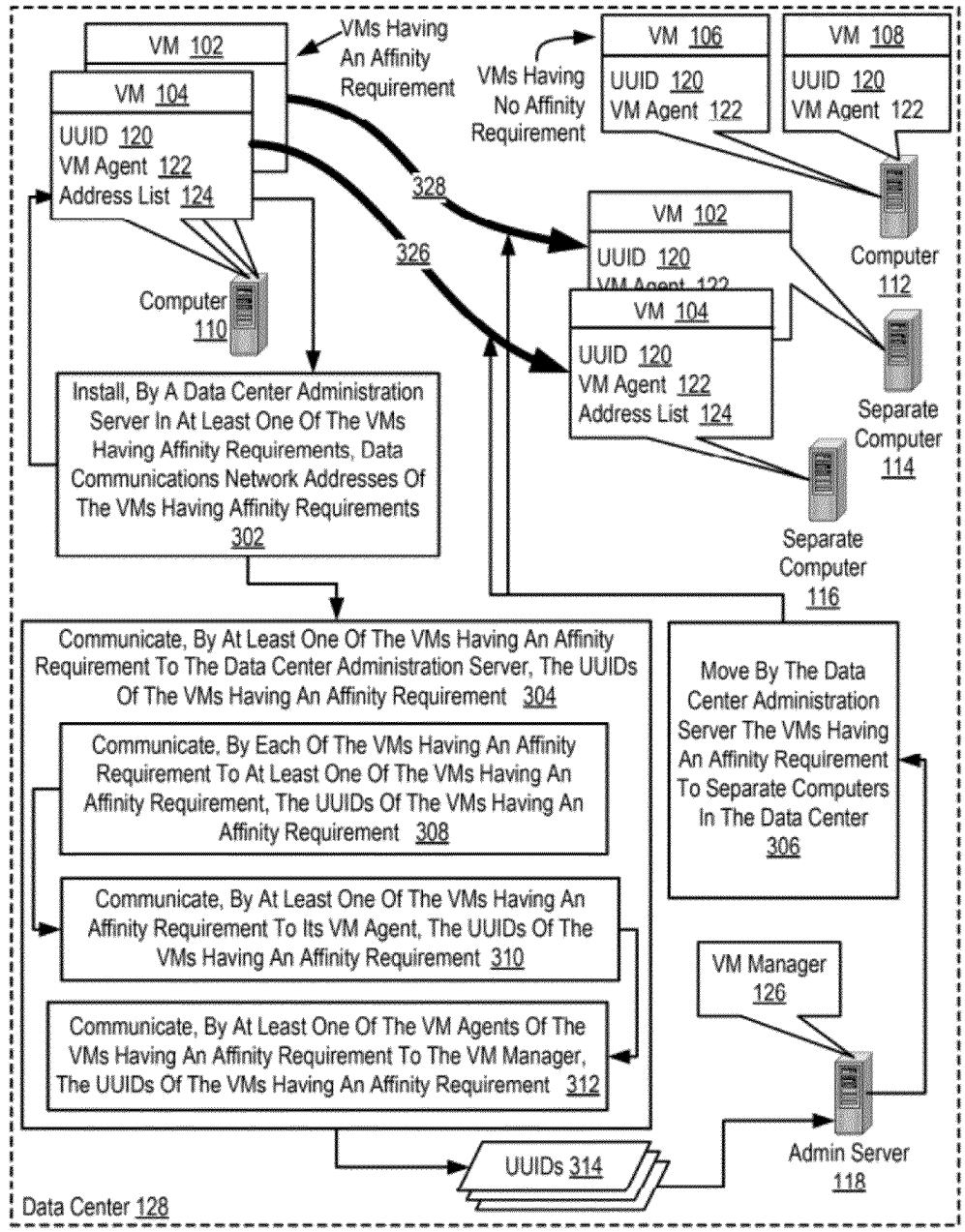
FIG. 2-5 set forth flowcharts illustrating example methods of administration of virtual machine affinity in a data center according to embodiments of the present invention.

For further explanation, FIG. 2 sets forth a flowchart illustrating an example method of administration of virtual machine affinity in a data center according to embodiments of the present invention. The method of FIG. 2 is implemented in a data center (128) by and upon apparatus similar to that described above with reference to FIG. 1, and the method of FIG. 2 is therefore described here with reference both to FIG. 2 and to FIG. 1. That is, the method is carried out in a data center (128) that includes VMs (102, 104, 106, 108), with each VM characterized by a UUID, and the data center includes a data center administration server (118) operably coupled to the VMs, operably coupled as in the example of FIG. 1 through a data communications network (100). At least two of the VMs (102, 104) have an affinity requirement to be installed on separate computers. In the example data center of FIG. 2, some of the VMs (106, 108) have no affinity requirements to be installed on separate computers and in fact remain installed on the same computer (112). The VMs (102, 104) that do have an affinity requirement, installed initially on the same computer (110), are moved to separate computers by methods that accord with embodiments of the present invention, as described in more detail below.

In the method of FIG. 2, operable coupling of the data center administration server to the VMs includes, not only the network (100), but also a VM manager (126) implemented as a module of automated computing machinery on the data center administration server (118) and VM agents (122) that are implemented as modules of automated computing machinery in the VMs. The VM Manager (126) is shown here for convenience of explanation as a single module of automated computing machinery installed upon the data center administration server (118), although as a practical matter, a data center can include multiple VM Managers, and VM Managers can be installed upon any data center computer or blade server having data communications connections to the VMs in the data center, including installation in a VM in a data center blade server, for example. The VM manager (126) implements administrative functions that communicate with the VM agents on the VMs to configure the VMs in the data center. The VM manager (126) and the VM agents (122) are configured to carry out data communications between the data center administration server (118) and the VMs (102, 104, 106, 108) through the network (100).

The method of FIG. 2 includes installing (302), by the data center administration server in at least one of the VMs having affinity requirements, data communications network addresses (124) of the VMs having affinity requirements. That is, the network addresses of the VMs having affinity requirements are included in lists (124) in each VM having an affinity requirement. The data center administration server can receive from an administrator (100) through a user interface (170) a list of network addresses of VMs having an affinity requirement and install the list on at least one of the VMs via the data communications network (100). The data center administration server can install the list on only one of the VMs having an affinity requirement, and that VM can poll the other VMs for their UUIDs. Or the data center administration server can install the list on all the VMs having an affinity requirement; all of them can broadcast their UUIDs each to the others; and all of them can provide the UUIDs to the data center administration server.

The method of FIG. 2 includes communicating (304), by at least one of the VMs having an affinity requirement to the data center administration server, the UUIDs of the VMs having an affinity requirement. In the method of FIG. 2, communicating (304) the UUIDs of the VMs having an affinity requirement includes communicating (308), by each of the VMs having an affinity requirement to at least one of the VMs having an affinity requirement, the UUIDs of the VMs having an affinity requirement. In an embodiment, one of the VMs can go through the network address list (124) and poll for the UUIDs of other VMs at the addresses in the address list (124).

In the method of FIG. 2, communicating (304) the UUIDs of the VMs having an affinity requirement also includes communicating (310), by at least one of the VMs having an affinity requirement to its VM agent, the UUIDs of the VMs that are characterized by an affinity requirement. The VM agent can, for example, expose an API function for this purpose, a function such as:

affinityManagement(UUIDList), in which the function affinityManagement( ) takes a call parameter named UUIDList that is a list of the UUIDs of the VMs having an affinity requirement.

In the method of FIG. 2, communicating (304) the UUIDs of the VMs having an affinity requirement also includes communicating (312), by at least one of the VM agents of the VMs having an affinity requirement to the VM manager, the UUIDs of the VMs having an affinity requirement. The VM manager can, for examples, expose an API function for this purpose, a function such as:

affinityInformation(UUIDList), in which the function affinityInformation( ) takes a call parameter UUIDList that is the same list of the UUIDs of the VMs having an affinity requirement. The data center administration server (118) maintains a list or database of information describing the VMs that are installed in the data center, and such information identifies the VMs by the UUIDs and includes the network addresses for all the VMs. The affinity requirements, however, are unknown to the data center administration server until the data center administration server is advised of the affinity requirements by at least one of the VMs having an affinity requirement. In embodiments in which one of the VMs polls the VMs having an affinity requirement, as few as one of the VMs can communicate the UUIDs to the data center administration server. In other embodiments, more than one of the VMs can communicate the UUIDs to the data center administration server, including as many as all of the VMs communicating the UUIDs to the data center administration server.

The method of FIG. 2 also includes moving (306) by the data center administration server the VMs having an affinity requirement to separate computers in the data center. Now that the data center administration server is advised of the existence of the affinity requirement and has the UUIDs of the VMs having the affinity requirement, the data center administration server can move the affected VMs to separate computers. In the example of FIG. 1, the data center administration server moves (328) VM (102) from computer (110) to a separate computer (114), thereby effectively moving the VMs having an affinity requirement to separate computers in the data center. In the example of FIG. 2, the data center administration server moves (326, 328) moves to separate computers (114, 116) both VMs (102, 104) having an affinity requirement.

Figure 3:
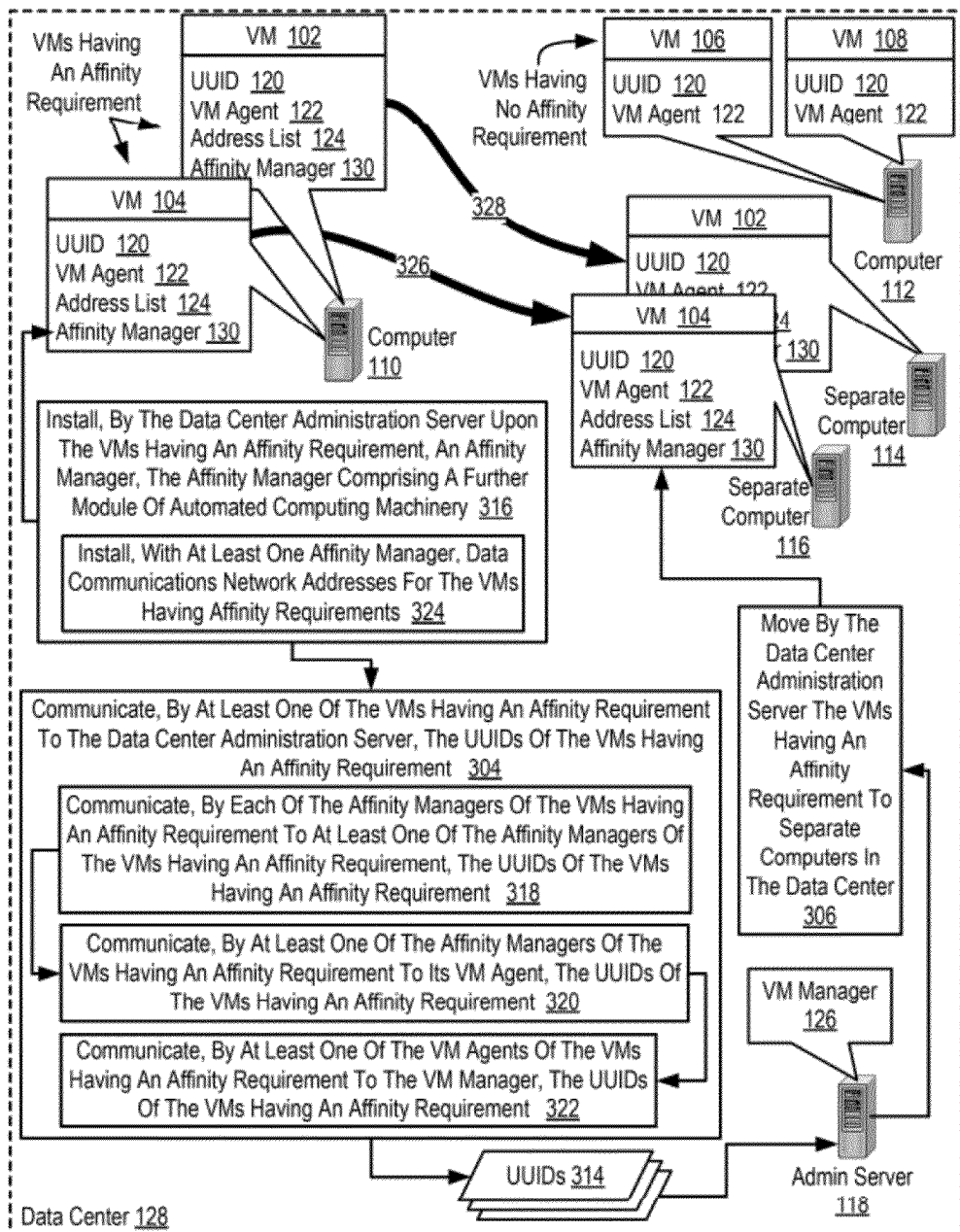

For further explanation, FIG. 3 sets forth a flowchart illustrating a further example method of administration of virtual machine affinity in a data center according to embodiments of the present invention. The method of FIG. 3 is implemented in a data center (128) by and upon apparatus similar to that described above with reference to FIG. 1, and the method of FIG. 3 is therefore described here with reference both to FIG. 3 and to FIG. 1. That is, the method is carried out in a data center (128) that includes VMs (102, 104, 106, 108), with each VM characterized by a UUID, and the data center includes a data center administration server (118) operably coupled to the VMs, operably coupled as in the example of FIG. 1 through a data communications network (100). At least two of the VMs (102, 104) have an affinity requirement to be installed on separate computers. In the example data center of FIG. 3, some of the VMs (106, 108) have no affinity requirements to be installed on separate computers and in fact remain installed on the same computer (112). The VMs (102, 104) that do have an affinity requirement, installed initially on the same computer (110), are moved to separate computers by methods that accord with embodiments of the present invention, as described in more detail below.

In the method of FIG. 3, operable coupling of the data center administration server to the VMs includes, not only the network (100), but also a VM manager (126) implemented as a module of automated computing machinery on the data center administration server and VM agents (122) that are implemented as modules of automated computing machinery in the VMs. The VM manager (126) on the data center administration server (118) implements administrative functions that communicate with the VM agents on the VMs to configure the VMs in the data center. The VM manager (126) and the VM agents (122) are configured to carry out data communications between the data center administration server (118) and the VMs (102, 104, 106, 108) through the network (100).

The method of FIG. 3 includes installing, by the data center administration server upon the VMs having an affinity requirement, an affinity manager. The affinity manager is a module of automated computing machinery that functions by communicating affinity requirements, UUIDs signifying affinity requirements, among VMs having affinity requirements and to a data center administration server. After the initial installation, a system administrator (100) can use an affinity management tool (170), a user interface exposed by the data center administration server (118), to instruct the data center administration server to install an affinity manager (130) in all VMs having an affinity requirement.

In the method of FIG. 3, installing (316) an affinity manager includes installing (324), with at least one affinity manager, data communications network addresses for the VMs having affinity requirements. That is, the network addresses of the VMs having affinity requirements are included with an affinity manager (130) in a list (124) in at least one of the VMs having an affinity requirement. The data center administration server can receive from an administrator (100) through a user interface (170) a list of network addresses of VMs having an affinity requirement and install the list, along with an affinity manager, on at least one of the VMs via the data communications network (100). The data center administration server can install the list on only one of the VMs having an affinity requirement, and that affinity manager can poll the other VMs for their UUIDs. Or the data center administration server can install the list on all the VMs having an affinity requirement; all of them can broadcast their UUIDs each to the others; and all of them can provide the UUIDs to the data center administration server.

The method of FIG. 3 includes communicating (304), by at least one of the VMs having an affinity requirement to the data center administration server, the UUIDs of the VMs having an affinity requirement. In the method of FIG. 3, communicating (304) the UUIDs of the VMs having an affinity requirement includes communicating (308), by each of the affinity managers of the VMs having an affinity requirement to at least one of the affinity managers of the VMs having an affinity requirement, the UUIDs of the VMs having an affinity requirement. In an embodiment, one of the affinity managers of the VMs can go through the network address list (124) and poll for the UUIDs of other VMs at the addresses in the address list (124).

In the method of FIG. 3, communicating (304) the UUIDs of the VMs having an affinity requirement also includes communicating (310), by at least one of the affinity managers of the VMs having an affinity requirement to its VM agent, the UUIDs of the VMs that are characterized by an affinity requirement. The VM agent can, for example, expose an API function for this purpose, a function such as:

affinityManagement(UUIDList), in which the function affinityManagement( ), when called by an affinity manager, takes a call parameter named UUIDList that is a list of the UUIDs of the VMs having an affinity requirement.

In the method of FIG. 3, communicating (304) the UUIDs of the VMs having an affinity requirement also includes communicating (312), by at least one of the VM agents of the VMs having an affinity requirement to the VM manager, the UUIDs of the VMs having an affinity requirement. The VM manager can, for examples, expose an API function for this purpose, a function such as:

affinityInformation(UUIDList), in which the function affinityInformation( ), when called by a VM agent, takes a call parameter UUIDList that is the same list of the UUIDs of the VMs having an affinity requirement. The data center administration server (118) maintains a list or database of information describing the VMs that are installed in the data center, and such information identifies the VMs by the UUIDs and includes the network addresses for all the VMs. The affinity requirements, however, are unknown to the data center administration server until the data center administration server is advised of the affinity requirements by at least one of the VMs having an affinity requirement. In embodiments in which one of the VMs polls the VMs having an affinity requirement, as few as one of the VMs can communicate the UUIDs to the data center administration server. In other embodiments, more than one of the VMs can communicate the UUIDs to the data center administration server, including as many as all of the VMs communicating the UUIDs to the data center administration server.

The method of FIG. 3 also includes moving (306) by the data center administration server the VMs having an affinity requirement to separate computers in the data center. Now that the data center administration server is advised of the existence of the affinity requirement and has the UUIDs of the VMs having the affinity requirement, the data center administration server can move the affected VMs to separate computers. In the example of FIG. 1, the data center administration server moves (328) VM (102) from computer (110) to a separate computer (114), thereby effectively moving the VMs having an affinity requirement to separate computers in the data center. In the example of FIG. 3, the data center administration server moves (326, 328) moves to separate computers (114, 116) both VMs (102, 104) having an affinity requirement.

Figure 4:
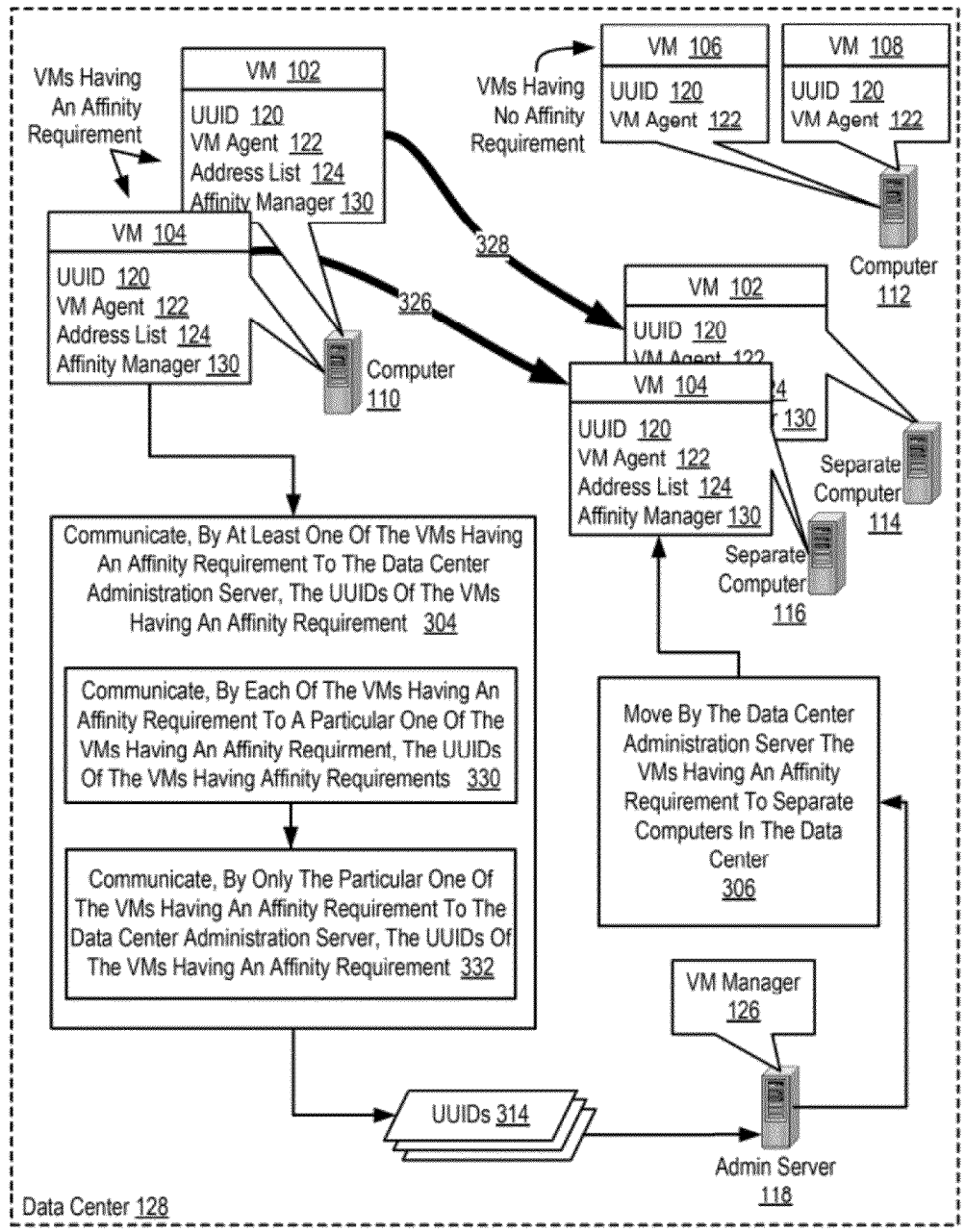

For further explanation, FIG. 4 sets forth a flowchart illustrating a further example method of administration of virtual machine affinity in a data center according to embodiments of the present invention. The method of FIG. 4 is similar to the methods of FIGS. 3 and 4, implemented in a data center (128) by and upon apparatus similar to that described above with reference to FIG. 1, and the method of FIG. 4 is also described here with reference both to FIG. 4 and also to FIG. 1. That is, the method is carried out in a data center (128) that includes VMs (102, 104, 106, 108), with each VM characterized by a UUID, and the data center includes a data center administration server (118) operably coupled to the VMs, operably coupled as in the example of FIG. 1 through a data communications network (100). At least two of the VMs (102, 104) have an affinity requirement to be installed on separate computers. In the example data center of FIG. 4, some of the VMs (106, 108) have no affinity requirements to be installed on separate computers and in fact remain installed on the same computer (112). The VMs (102, 104) that do have an affinity requirement, installed initially on the same computer (110), are moved to separate computers by methods that accord with embodiments of the present invention, as described in more detail below.

In the method of FIG. 4, operable coupling of the data center administration server to the VMs includes, not only the network (100), but also a VM manager (126) implemented as a module of automated computing machinery on the data center administration server and VM agents (122) that are implemented as modules of automated computing machinery in the VMs. The VM manager (126) on the data center administration server (118) implements administrative functions that communicate with the VM agents on the VMs to configure the VMs in the data center. The VM manager (126) and the VM agents (122) are configured to carry out data communications between the data center administration server (118) and the VMs (102, 104, 106, 108) through the network (100).

The method of FIG. 4, like the methods of FIGS. 2 and 3, includes communicating (304), by at least one of the VMs having an affinity requirement to the data center administration server, the UUIDs of the VMs having an affinity requirement. In the method of FIG. 4, however, communicating (304) the UUIDs of the VMs having an affinity requirement includes communicating (330), by each of the VMs having an affinity requirement to a particular one of the VMs having an affinity requirement, the UUIDs of the VMs having affinity requirements. In an embodiment, the particular single VM to receive the UUIDs can be selected by agreement according a protocol or algorithm such as, for example, the first VM whose affinity manager contacts the other VMs having an affinity requirement. In other embodiments, the single particular VM can be identified as the only VM having an affinity requirement that also is in possession of the network addresses of the other VMs having the same affinity requirement—so that when the affinity managers execute, only one of them has the information needed to poll the others for their UUIDs.

In the method of FIG. 4, communicating (304) the UUIDs of the VMs having an affinity requirement also includes communicating (332), by only the particular one of the VMs having an affinity requirement to the data center administration server, the UUIDs of the VMs having an affinity requirement. In this example, only the particular single VM comes into possession of all of the UUIDs of the VMs having the affinity requirement, so that only one of the VMs is actually capable of communicating the UUIDs to the data center administration server.

The method of FIG. 4, like the methods of FIGS. 2 and 3, also includes moving (306) by the data center administration server the VMs having an affinity requirement to separate computers in the data center. Now that the data center administration server is advised of the existence of the affinity requirement and has the UUIDs of the VMs having the affinity requirement, the data center administration server can move the affected VMs to separate computers. In the example of FIG. 1, the data center administration server moves (328) VM (102) from computer (110) to a separate computer (114), thereby effectively moving the VMs having an affinity requirement to separate computers in the data center. In the example of FIG. 4, the data center administration server moves (326, 328) moves to separate computers (114, 116) both VMs (102, 104) having an affinity requirement.

Figure 5:
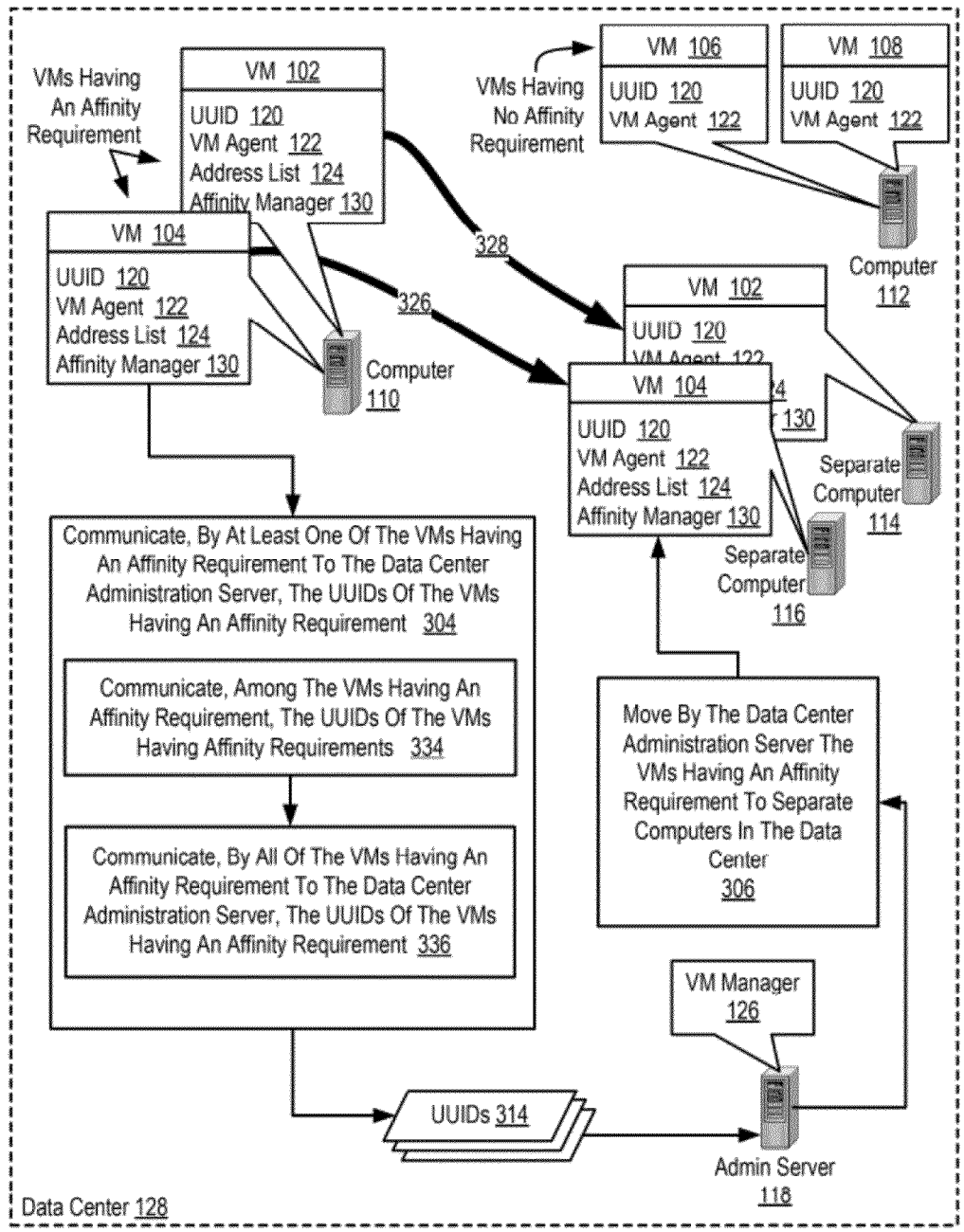

For further explanation, FIG. 5 sets forth a flowchart illustrating a further example method of administration of virtual machine affinity in a data center according to embodiments of the present invention. The method of FIG. 5 is similar to the methods of FIGS. 3 and 4, implemented in a data center (128) by and upon apparatus similar to that described above with reference to FIG. 1, and the method of FIG. 5 is also described here with reference both to FIG. 5 and also to FIG. 1. That is, the method is carried out in a data center (128) that includes VMs (102, 104, 106, 108), with each VM characterized by a UUID, and the data center includes a data center administration server (118) operably coupled to the VMs, operably coupled as in the example of FIG. 1 through a data communications network (100). At least two of the VMs (102, 104) have an affinity requirement to be installed on separate computers. In the example data center of FIG. 5, some of the VMs (106, 108) have no affinity requirements to be installed on separate computers and in fact remain installed on the same computer (112). The VMs (102, 104) that do have an affinity requirement, installed initially on the same computer (110), are moved to separate computers by methods that accord with embodiments of the present invention, as described in more detail below.

In the method of FIG. 5, operable coupling of the data center administration server to the VMs includes, not only the network (100), but also a VM manager (126) implemented as a module of automated computing machinery on the data center administration server and VM agents (122) that are implemented as modules of automated computing machinery in the VMs. The VM manager (126) on the data center administration server (118) implements administrative functions that communicate with the VM agents on the VMs to configure the VMs in the data center. The VM manager (126) and the VM agents (122) are configured to carry out data communications between the data center administration server (118) and the VMs (102, 104, 106, 108) through the network (100).

The method of FIG. 5, like the methods of FIGS. 2, 3, and 4, includes communicating (304), by at least one of the VMs having an affinity requirement to the data center administration server, the UUIDs of the VMs having an affinity requirement. In the method of FIG. 5, communicating (304) the UUIDs of the VMs having an affinity requirement includes communicating (334), among the VMs (102, 104) having an affinity requirement, the UUIDs (120) of the VMs having affinity requirements. In an example embodiment, all of the VMs having an affinity requirement are configured with the network addresses (124) of all the VMs having the same affinity requirement, and all of the VMs having the affinity requirement broadcast through network (100) their UUIDs to all the other VMs having the same affinity requirement.

In the method of FIG. 5, communicating (304) the UUIDs of the VMs having an affinity requirement also includes communicating (336), by all of the VMs having an affinity requirement to the data center administration server, the UUIDs of the VMs having an affinity requirement. After step (334), all of the VMs (102, 104) having an affinity requirement are in possession of all the UUIDs (120) of the VMs having the same affinity requirement, and they all send all of the UUIDs to the data center administration server (118). This method is redundant, but it is simple and comprehensive.

The method of FIG. 5, like the methods of FIGS. 2, 3, and 4, also includes moving (306) by the data center administration server the VMs having an affinity requirement to separate computers in the data center. Now that the data center administration server is advised of the existence of the affinity requirement and has the UUIDs of the VMs having the affinity requirement, the data center administration server can move the affected VMs to separate computers. In the example of FIG. 1, the data center administration server moves (328) VM (102) from computer (110) to a separate computer (114), thereby effectively moving the VMs having an affinity requirement to separate computers in the data center. In the example of FIG. 5, the data center administration server moves (326, 328) moves to separate computers (114, 116) both VMs (102, 104) having an affinity requirement.

Example embodiments of the present invention are described largely in the context of a fully functional computer system for administration of virtual machine affinity in a data center. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in a flowchart or block diagram may represent a module, segment, or portion of code or other automated computing machinery, which comprises one or more executable instructions or logic blocks for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administration of virtual machine affinity in a data center, the data center comprising a plurality of virtual machines ('VMs'), each VM comprising a module of automated computing machinery installed upon a computer in the data center and characterized by a Universally Unique Identifier ('UUID'), the plurality of VMs comprising a first VM and a second VM, the first VM having an affinity requirement to be installed on a different computer than the second VM, the second VM having an affinity requirement to be installed on a different computer than the first VM, the data center further comprising a data center administration server operably coupled to the VMs, the method comprising:
    communicating, by the first VM to the data center administration server, the UUID of the second VM; and
    moving by the data center administration server, the first VM to a different computer in the data center than the second VM.

2. The method of claim 1 further comprising installing, by the data center administration server in the first VM, data communications network addresses of the second VM.

3. The method of claim 1 wherein:
    the data center administration server operably coupled to the VMs further comprises the data center administration server operably coupled to the VMs through a VM manager implemented as a module of automated computing machinery on the data center administration server and VM agents that are implemented as modules of automated computing machinery in the VMs, the VM manager on the data center administration server comprising administrative functions that communicate with the VM agents on the VMs to configure the VMs in the data center; and
    communicating, by the first VM, to the data center administration server, the UUID of the second VM further comprises:
    communicating, by the second VM to the first VM, the UUID of the second VM;
    communicating, by the first VM to at least one VM agent, the UUIDs of the first and second VMs; and
    communicating, by the at least one VM agent to the VM manager, the UUIDs of the first and second VMs.

4. The method of claim 1 wherein:
    the data center administration server operably coupled to the VMs further comprises the data center administration server operably coupled to the VMs through a VM manager implemented as a module of automated computing machinery on the data center administration server and VM agents that are implemented as modules of automated computing machinery in the VMs, the VM manager on the data center administration server comprising administrative functions that communicate with the VM agents on the VMs to configure the VMs in the data center;
    the method further comprises installing, by the data center administration server upon the first and second VMs, affinity managers, each of the affinity managers comprising a further module of automated computing machinery; and
    communicating the UUID of the second VM further comprises:
    communicating, by each of the affinity managers of the first and second VMs to at least one of the other affinity managers of the first and second VMs, the UUIDs of the first and second VMs;
    communicating, by at least one of the affinity managers of the first and second VMs to at least one VM agent, the UUIDs of the first and second VMs; and
    communicating, by the at least one VM agent to the VM manager, the UUIDs of the first and second VMs.

5. The method of claim 4 wherein installing the affinity managers further comprises installing, with at least one affinity manager, data communications network addresses for the first and second VMs.

6. The method of claim 1 wherein communicating the UUID of the second VM further comprises:
    communicating, by each of the first and second VMs to a particular one of the first and second VMs, the UUIDs of the first and second VMs; and
    communicating, by only the particular one of the first and second VMs to the data center administration server, the UUIDs of the first and second VMs.

7. The method of claim 1 wherein communicating the UUID of the second VM further comprises:
    communicating, among the first and second VMs, the UUIDs of the first and second VMs; and
    communicating, by the first and second VMs to the data center administration server, the UUIDs of the first and second VMs.

8. An apparatus for administration of virtual machine affinity in a data center, the apparatus comprising:
    a plurality of virtual machines ('VMs'), each VM comprising a module of automated computing machinery installed upon a computer in the data center and characterized by a Universally Unique Identifier ('UUID'), the plurality of VMs comprising a first VM and a second VM, the first VM having an affinity requirement to be installed on a different computer than the second VM, the second VM having an affinity requirement to be installed on a different computer than the first VM,
    a data center administration server operably coupled to the VMs through a VM manager implemented as a module of automated computing machinery on the data center administration server and VM agents that are implemented as modules of automated computing machinery in the VMs, the VM manager on the data center administration server comprising administrative functions that communicate with the VM agents on the VMs to configure the VMs in the data center;
    at least one computer processor; and
    a computer memory operatively coupled to the computer processor, the computer memory having disposed within it computer program instructions which when executed cause the apparatus to function by:
    communicating, by the first VM to the data center administration server, the UUID of the second VM; and
    moving by the data center administration server, the first VM to a different computer in the data center than the second VM.

9. The apparatus of claim 8 wherein the computer program instructions further cause the apparatus to function by installing, by the data center administration server in the first VM, data communications network addresses of the second VM.

10. The apparatus of claim 8 wherein:
    the data center administration server operably coupled to the VMs further comprises the data center administration server operably coupled to the VMs through a VM manager implemented as a module of automated computing machinery on the data center administration server and VM agents that are implemented as modules of automated computing machinery in the VMs, the VM manager on the data center administration server comprising administrative functions that communicate with the VM agents on the VMs to configure the VMs in the data center; and
    communicating, by the first VM, to the data center administration server, the UUID of the second VM further comprises:
    communicating, by the second VM to the first VM, the UUID of the second VM;

communicating, by the first VM to at least one VM agent, the UUIDs of the first and second VMs; and communicating, by the at least one VM agent to the VM manager, the UUIDs of the first and second VMs.

11. The apparatus of claim 8 wherein:

the data center administration server operably coupled to the VMs further comprises the data center administration server operably coupled to the VMs through a VM manager implemented as a module of automated computing machinery on the data center administration server and VM agents that are implemented as modules of automated computing machinery in the VMs, the VM manager on the data center administration server comprising the administrative functions that communicate with the VM agents on the VMs to configure the VMs in the data center;

the computer program instructions further cause the apparatus to function by installing, by the data center administration server upon the first and second VMs, affinity managers, each of the affinity managers comprising a further module of automated computing machinery; and communicating the UUID of the second VM further comprises:

communicating, by each of the affinity managers of the first and second VMs to at least one of the other affinity managers of the first and second VMs, the UUIDs of the first and second VMs;

communicating, by at least one of the affinity managers of the first and second VMs to at least one VM agent, the UUIDs of the first and second VMs; and communicating, by the at least one VM agent to the VM manager, the UUIDs of the first and second VMs.

12. The apparatus of claim 11 wherein installing the affinity managers further comprises installing, with at least one affinity manager, data communications network addresses for the first and second VMs.

13. The apparatus of claim 8 wherein communicating the UUID of the second VM further comprises:

communicating, by each of the first and second VMs to a particular one of the first and second VMs, the UUIDs of the first and second VMs; and communicating, by only the particular one of the first and second VMs to the data center administration server, the UUIDs of the first and second VMs.

14. The apparatus of claim 8 wherein communicating the UUID of the second VM further comprises:

communicating, among the first and second VMs, the UUIDs of the first and second VMs; and communicating, by the first and second VMs to the data center administration server, the UUIDs of the first and second VMs.

15. A computer program product for administration of virtual machine affinity in a data center, the computer program product comprising a non-transitory computer readable medium and the data center comprising:

a plurality of virtual machines ('VMs'), each VM comprising a module of automated computing machinery installed upon a computer in the data center and characterized by a Universally Unique Identifier ('UUID'), the plurality of VMs comprising a first VM and a second VM, the first VM having an affinity requirement to be installed on a different computer than the second VM, the second VM having an affinity requirement to be installed on a different computer than the first VM;

a data center administration server operably coupled to the VMs through a VM manager implemented as a module of automated computing machinery on the data center administration server and VM agents that are implemented as modules of automated computing machinery in the VMs, the VM manager on the data center administration server comprising administrative functions that communicate with the VM agents on the VMs to configure the VMs in the data center; and the non-transitory computer readable medium comprising computer program instructions which when executed cause VMs and computers in the data center to function by:

communicating, by the first VM to the data center administration server, the UUID of the second VM; and moving by the data center administration server, the first VM to a different computer in the data center than the second VM.

16. The non-transitory computer program product of claim 15 wherein the computer program instructions further cause the computers and VMs to function by installing, by the data center administration server in the first VM, data communications network addresses of the second VM.

17. The non-transitory computer program product of claim 15 wherein:

the data center administration server operably coupled to the VMs further comprises the data center administration server operably coupled to the VMs through a VM manager implemented as a module of automated computing machinery on the data center administration server and VM agents that are implemented as modules of automated computing machinery in the VMs, the VM manager on the data center administration server comprising administrative functions that communicate with the VM agents on the VMs to configure the VMs in the data center; and communicating, by the first VM, to the data center administration server, the UUID of the second VM further comprises:

communicating, by the second VM to the first VM, the UUID of the second VM;

communicating, by the first VM to at least one VM agent, the UUIDs of the first and second VMs; and communicating, by the at least one VM agent to the VM manager, the UUIDs of the first and second VMs.

18. The non-transitory computer program product of claim 15 wherein:

the data center administration server operably coupled to the VMs further comprises the data center administration server operably coupled to the VMs through a VM manager implemented as a module of automated computing machinery on the data center administration server and VM agents that are implemented as modules of automated computing machinery in the VMs, the VM manager on the data center administration server comprising the administrative functions that communicate with the VM agents on the VMs to configure the VMs in the data center;

the computer program instructions further cause the computers and VMs to function by installing, by the data center administration server upon the first and second VMs, affinity managers, each of the affinity managers comprising a further module of automated computing machinery; and communicating the UUID of the second VM further comprises:

communicating, by each of the affinity managers of the first and second VMs to at least one of the other affinity managers of the first and second VMs, the UUIDs of the first and second VMs;

communicating, by at least one of the affinity managers of the first and second VMs to at least one VM agent, the UUIDs of the first and second VMs; and communicating, by the at least one VM agent to the VM manager, the UUIDs of the first and second VMs.

19. The non-transitory computer program product of claim 18 wherein installing the affinity managers further comprises installing, with at least one affinity manager, data communications network addresses for the first and second VMs.

20. The non-transitory computer program product of claim 15 wherein communicating the UUID of the second VM further comprises:

communicating, by each of the first and second VMs to a particular one of the first and second VMs, the UUIDs of the first and second VMs; and communicating, by only the particular one of the first and second VMs to the data center administration server, the UUIDs of the first and second VMs.

* * * * *